US012620822B2

(12) United States Patent
Kennard et al.

(10) Patent No.: US 12,620,822 B2
(45) Date of Patent: May 5, 2026

(54) MOBILE POWER TOOL BATTERY CHARGING POD WITH LOCKABLE COMPARTMENTS

(71) Applicants:MAKINEX IP PTY LTD, Artarmon (AU); LENDLEASE BUILDING PTY LTD, Barangaroo (AU)

(72) Inventors: Rory Campbell Kennard, Sydney (AU); Jason King, Barangaroo (AU)

(73) Assignees: MAKINEX IP PTY LTD, Artarmon (AU); LENDLEASE BUILDING PTY LTD, Barangaroo (AU)

( * ) Notice: Subject to any disclaimer, the term of this patent is extended or adjusted under 35 U.S.C. 154(b) by 654 days.

(21) Appl. No.: 17/921,558

(22) PCT Filed: Apr. 27, 2021

(86) PCT No.: PCT/AU2021/050377
§ 371 (c)(1),
(2) Date: Oct. 26, 2022

(87) PCT Pub. No.: WO2021/217201
PCT Pub. Date:Nov. 4, 2021

(65) Prior Publication Data
US 2023/0163608 A1 May 25, 2023

(30) Foreign Application Priority Data
Apr. 27, 2020 (AU) ................................ 2020901324

(51) Int. Cl.
*H01M 10/46* (2006.01)
*H02J 7/00* (2006.01)
*H02J 7/02* (2016.01)

(52) U.S. Cl.
CPC .......... *H02J 7/0044* (2013.01); *H02J 7/0013* (2013.01); *H02J 7/0029* (2013.01); *H02J 7/0045* (2013.01); *H02J 7/02* (2013.01)

(58) Field of Classification Search
CPC ...... H02J 7/0044; H02J 7/0042; H02J 7/0013; H02J 7/0045; H02J 7/0029; H02J 7/02
(Continued)

(56) References Cited

FOREIGN PATENT DOCUMENTS

AU 2013200615 8/2013
CN 211491423 U * 9/2020
(Continued)

OTHER PUBLICATIONS

Machine translate of CN-211491423-U (Sep. 15, 2020) (Year: 2020).*

(Continued)

*Primary Examiner* — Edward Tso
(74) *Attorney, Agent, or Firm* — NIXON & VANDERHYE, P.C.

(57) ABSTRACT

A power tool battery charging station (1) in the form of a mobile pod. The station/pod (1) includes a housing (2) and a plurality of compartments (3). Each compartment (3) has a lockable door (4), and a cutout (5) through which an electrical cord may be provided. Ventilation cutouts (7) may additionally be provided in the housing (2). The housing (2) incorporates a plurality of electrical outlets (6), each adapted to receive a plug of a respective power tool battery. The housing (2) additionally incorporates a circuit breaker operatively connected to the electrical outlets (6).

19 Claims, 13 Drawing Sheets

(58) Field of Classification Search
USPC .................. 320/107, 111, 115, 116, 109, 114
See application file for complete search history.

(56) References Cited

FOREIGN PATENT DOCUMENTS

| CN | 117275147 A | * 12/2023 | ............. G07F 17/12 |
|----|-------------|-----------|-------------------------|
| GB | 2 428 525 | 1/2007 | |

OTHER PUBLICATIONS

"Power Station", published Apr. 20, 2020, 2 pages, < URL: https://www.youtube.com/watch?v=U5HUEXA6FB4 >.

"Tool charging station", published Jan. 24, 2020, 2 pages, < URL: https://www.youtube.com/watch?v=d5yUrrMYNAU&feature=youtu.be 22 .

"Milwaukee 46" Tool Chest / Cabinet Combo—48-22-8500", published May 29, 2015, 2 pages, <URL: https://www.youtube.com/watch?v32 bS4hn_L_Izk>.

"DeWalt 36" Rolling Cabinet & Chest Tool Box Review", published Jul. 16, 2016, 2 pages, <URL: https://www.youtube.com/watch?v=eVKGvB184_Q>.

International Preliminary Report on Patentability for PCT/AU2021/050377 dated Jul. 7, 2022, 16 pages.

Written Opinion of the IPEA for PCT/AU2021/050377 dated Mar. 30, 2022, 4 pages.

International Search Report for PCT/AU2021/050377 dated May 28, 2021, 5 pages.

Written Opinion of the ISA for PCT/AU2021/050377 dated May 28, 2021, 6 pages.

* cited by examiner

MOBILE POWER TOOL BATTERY CHARGING POD WITH LOCKABLE COMPARTMENTS

CROSS-REFERENCE TO RELATED APPLICATIONS

This application is the U.S. national phase of International Application No. PCT/AU2021/050377 filed Apr. 27, 2021 which designated the U.S. and claims priority to AU Patent Application No. 2020901324 filed Apr. 27, 2020, the entire contents of each of which are hereby incorporated by reference.

BACKGROUND OF THE INVENTION

The present invention relates to a mobile charging pod or station for charging tools/batteries, and in particular to such a mobile charging pod/station which is useful on building and construction sites where power tools are typically used.

In particular, the present invention relates to a mobile pod or power tool battery power station which includes a plurality of lockable compartments, in which power tools can be securely housed whilst being charged.

DESCRIPTION OF THE PRIOR ART

Any reference herein to known prior art does not, unless the contrary indication appears, constitute an admission that such prior art is commonly known by those skilled in the art to which the invention relates, at the priority date of this application.

Various types of lockable compartmentalised cabinets are presently known for storing a variety of products. With the reasonably recent widespread use of mobile phones and smart phones, specialised phone lockers have been developed into which users may place their phone to be charged. These specialised lockers typically incorporate a USB or other low voltage power outlet, into which the electronic device may be plugged. The locker is then closed and locked whilst being charged, such that the device is not readily able to be removed without the authorised owner of the device unlocking the lock. Such known cabinets are not portable nor rugged enough to withstand the abuse they would receive in environments such as on building and construction sites and being regularly transported thereto.

Whilst such phone lockers are suitable for securely charging mobile phones and like low powered devices, they are not suitable for charging mains power tools and other equipment. Batteries used for power tools also typically generate considerable heat during the charging process, compared with the batteries used in mobile phones and similar electronic devices, and as such, must be properly ventilated to ensure that they do not overheat.

SUMMARY OF THE INVENTION

The present invention seeks to provide a mobile charging pod or charging station which overcomes at least some of the drawbacks of the prior art.

The present invention also seeks to provide a charging station which is suitable for charging mains powered devices, which typically have batteries which dissipate considerable heat whilst being charged.

The present invention also seeks to provide a charging station which securely stores power tools, batteries therefor and the like, whilst being charged.

The present invention also seeks to provide a charging station which facilitates ventilation and/or inspection of power tools during the charging process.

In one broad form, the present invention provides a power tool battery charging station, including:

a mobile pod having a housing, a plurality of compartments in said housing, each compartment adapted to receive at least one power tool battery charger therein;

a lockable door on each compartment;

a cutout associated with each compartment, through which an electrical cord of a respective power tool battery charger is adapted to be provided;

a plurality of electrical outlets provided on said housing outside said compartments, each outlet adapted to receive a plug of a respective power tool battery charger; and, a circuit breaker, associated with said housing, operatively connected to said electrical outlets.

Preferably, the housing is substantially weatherproof.

Preferably, each lockable door is adapted to receive any one or combination of:

a padlock;

a key operated lock;

an electronic lock;

a smart phone operable lock;

a fingerprint or other biometrically operated lock;

a keypad operated; and, a combination lock.

Preferably, each compartment is provided with any one or combination of:

at least one electrical cord cutout;

at least one ventilation cutout therein; and, at least one inspection window therethrough.

Also preferably, each electrical outlet is any one or combination of:

a mains power supply electrical outlet;

a single or double GPO electrical outlet; and, a weatherproof or waterproof electrical outlet.

Also preferably, said circuit breaker includes an outlet/switch provided on the outer wall of said housing.

Also preferably, said housing includes at least one wheel or roller thereon, optionally incorporating a locking and/or braking mechanism.

Alternatively or additionally, but also preferably, said housing may be mounted on a skid.

Also preferably, said housing includes a motor therein for power assisted movement of said housing.

Also preferably, said housing includes at least one handle.

Also preferably, said housing includes at least one lifting eye thereon.

Also preferably, said housing includes at least one fork lift engagement mechanism thereon.

Also preferably, said housing includes at least one lock down chain point connection thereon.

In a preferred embodiment thereof, said housing includes a plurality of compartments formed in any on or combination of:

at least one column, wherein the compartments are substantially vertically disposed relative to each other; and, at least one row, wherein the compartments are substantially horizontally disposed relative to each other.

Preferably, said housing includes:

a plurality of compartments formed in at least two columns; and,

a plurality of outlets formed in at least one column which is positioned intermediate to said two columns of compartments.

Preferably, said housing and/or said door(s) is/are formed substantially of any one or combination of:

electrically insulative material,

UV stabilised material; and, fire rated polymer, such as polyethylene;

Also preferably, said housing includes a mains power cable adapted to supply mains power to said charging station, including any one or combination of:

power cleats about which said power cord may be wrapped; and a retraction mechanism adapted to retract said mains power cable within said housing.

In a preferred version, said housing is adapted to be wall mounted.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF PREFERRED EMBODIMENT(S)

Throughout this specification, like numerals will be used to identify like features, except where expressly otherwise indicated.

Figure 11:
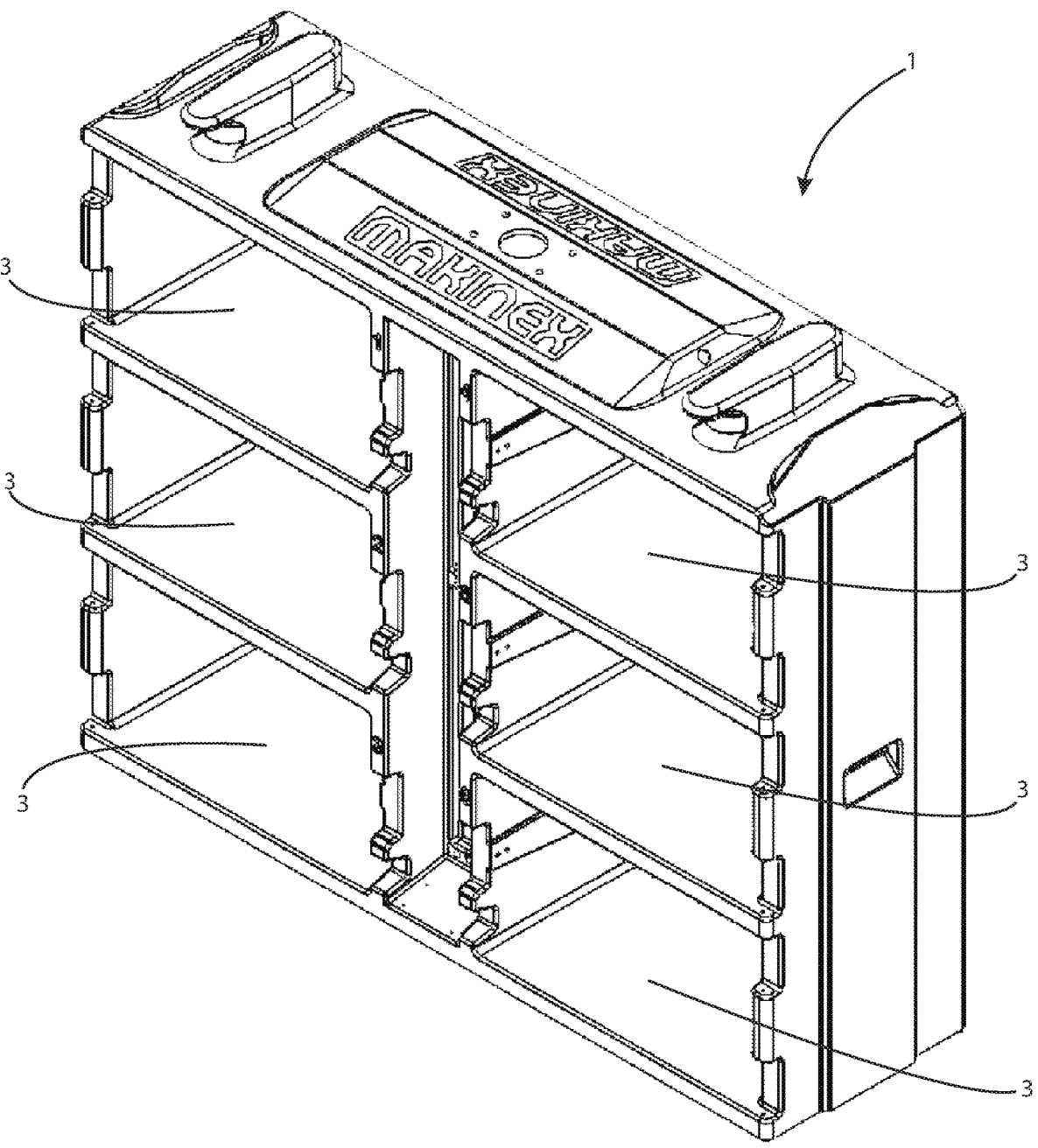
FIG. 11 illustrates an isometric view of the housing of the charging station.

As shown in the drawings, the mobile charging pod or power tool battery charging station, generally designated by the numeral 1, includes a housing 2, which is divided into a plurality of compartments 3, as perhaps best shown in FIG. 11. Whilst the number of compartments may vary, the illustrated embodiment shows the housing having six compartments 3. Each compartment 3 is adapted to receive at least one power tool and/or battery charger (not shown), as will be described hereinafter.

Figure 12:
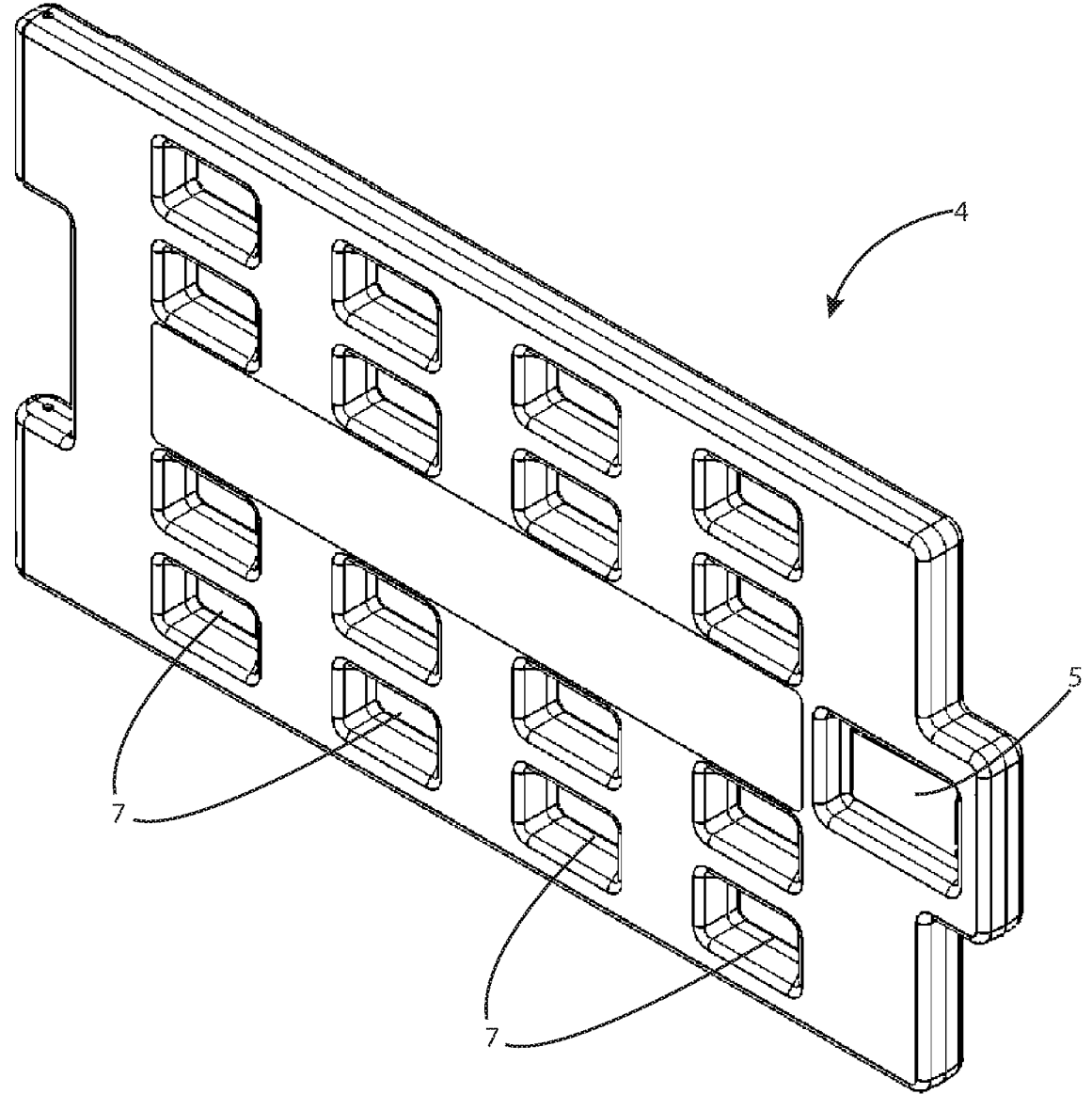
FIG. 12 illustrates an isometric view of a compartment door of the charging station.

A lockable door 4 is associated with each compartment 3. FIG. 12 shows an exemplary embodiment of a door 4, separated from the housing 2, whilst FIGS. 1 to 5 show a plurality of doors 4 attached to the housing 2.

Each compartment 3 or each door 4 preferably has at least one cutout 5 therein through which, in use, an electrical cord of a respective power tool battery charger is adapted to be provided.

A plurality of electrical outlets 6 is preferably provided on an outer wall of said housing. Each outlet 6 is adapted to receive a plug of a respective power tool battery charger.

The outlets 6 may be any form of type of electrical outlet, and may typically be embodied as a mains power supply electrical outlet. The outlet 6 may typically be a single or double GPO electrical outlet.

In one example form the mobile pod housing is substantially waterproof or weatherproof for protection of the electrical batteries and other electrical products placed in the compartments, and at least one of outlets 6 may be embodied as a weatherproof or waterproof electrical outlet.

The provision of the outlets/sockets on the outside of the compartments enables the electrical tags attached to the plugs of the power tools to be readily inspected by safety officers or other inspection personnel whilst protection from external environmental elements such as adverse weather conditions.

In use, after a power tool in installed in a compartment 3, the power cable of the power tool is fed through the outlet cutout 5 in the housing 2 and plugged into one of the electrical outlets 6. The door 4 may then be closed and locked, securely maintaining the power tool in the compartment 3.

For example, a padlock may be attached to an appropriate padlock attachment orifice. A recess 16 may be additionally provided in the door 4 so that the metal tab of the padlock does not protrude past the overall extremities of the housing 1, and hence is protected from damage.

A switch 6A of the respective outlet 6 may then be operated by placing it into the on position, such that the charging operation may be initiated.

As the charging operation occurs, the power tool is visible via openings 7. This provision of the openings 7 facilitates inspection of the tool by the owner of the tool, and/or by others, including by any safety personnel.

Figure 13:
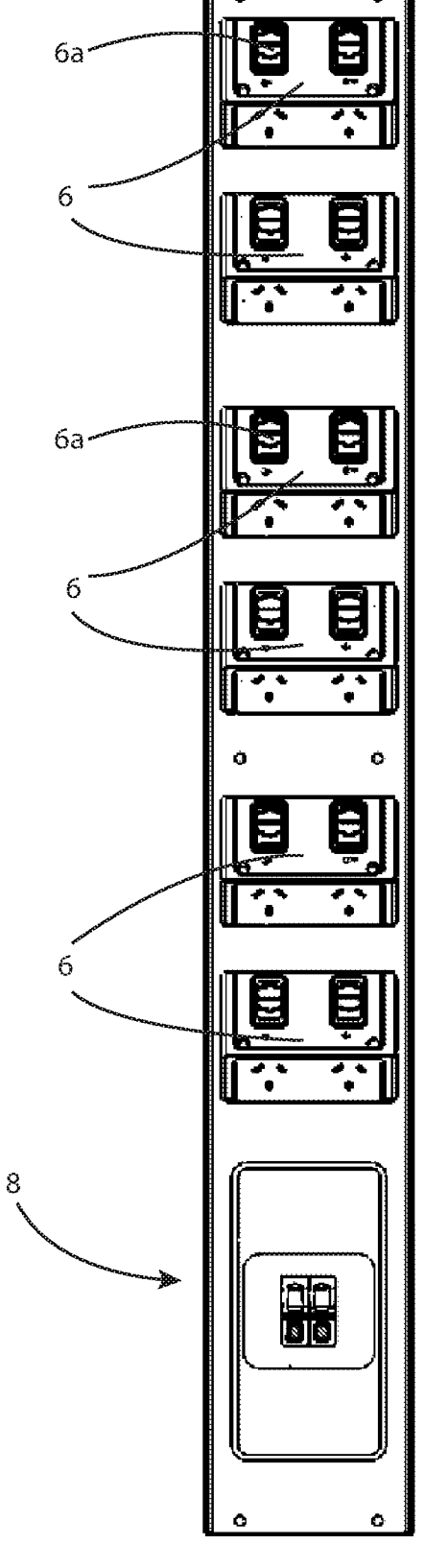
FIG. 13 illustrates a front view of one embodiment of the power outlet panel of the charging station; and, FIG. 14 illustrates a front view of another embodiment of the power outlet panel of the charging station.
Figure 14:
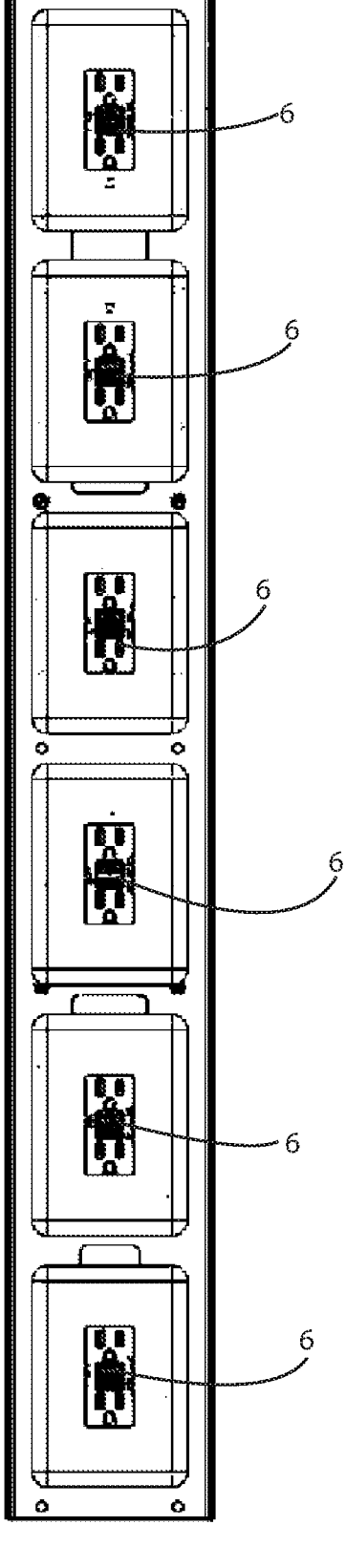

A circuit breaker 8 (see FIG. 13) and/or any electronic circuitry which may be desired to ensure the appropriate safe charging of the power tool(s) provided in the/each compartment may be additionally provided within or on the housing 2, operatively connected to the or each electrical outlet 6. The circuit breaker 8 may be of the type incorporating a resettable switch which may be operated in the event of a tripping occurrence.

Each lockable door 4 is adapted to be locked by any one or combination of a padlock, a key operated lock, an electronic lock, a smart phone operable lock, a fingerprint or other biometrically operated lock, a keypad operated lock, a combination lock, or any other form of lock. Various preferred types of locks and optional alternative locks will become apparent, depending on the particular installation of the charging station 1.

Each door 4 is preferably also provided with any one or combination of at least one power cord cutout, at least one ventilation cutouts 7, and/or, at least one inspection window therethrough. These may be designed to be separate purpose-built cutouts, windows or orifices 7, or they can be used for any one or combination of these purposes The housing 2 is preferably embodied as a mobile housing, to include at least one wheel 9 or roller thereon, optionally incorporating a locking and/or braking mechanism. This is to facilitate ease of moving the housing 2, when desired, whilst, preventing its movement at other times.

The housing 2 may alternatively or additionally be mounted on a skid, for use in environments where wheels may not be appropriate. In one example embodiment, the wheels may retract from within the skid such that when suitable, the housing may be rolled on the substrate surface.

The housing 2 may also optionally include a motor therein for power assisted movement of said housing 2. This is particularly useful if the housing 2 is large and/or heavy, to avoid having to manually push the housing 2 to a desired position, when required.

Preferably, the housing 2 further includes at least one handle 10. This enables a user to readily grip onto the housing 2, for example when it is desired to move it about.

The housing 2 may also incorporate at least one lifting eye 11 thereon. This is particularly useful when the charging station 1 is required to be craned onto a building site, particularly if it is installed or removed from a substantially elevated position.

The charging station 1 may also be adapted to be lifted by a fork lift, and may optionally include a fork lift engagement mechanism thereon. This also facilitates the relocation of the charging station 1 as desired by a fork lift.

The housing 2 may also optionally include at least one lock down chain point connection 12 thereon. This facilitates the securement of the charging station to a substrate or to another object, to avoid the housing 2, per se, being moved without appropriate authorisation and/or being blown in the event of high winds which may typically occur on a high rise construction site.

The housing 2 may also incorporate a plurality of compartments 3 formed in any one or combination of at least one column, wherein the compartments are substantially vertically disposed relative to each other, and, at least one row, wherein the compartments 3 are substantially horizontally disposed relative to each other. Any number of rows and columns may be provided, depending upon the particular situation.

For example, and without limitation, the illustrated embodiment shows the housing 2 including a plurality of compartments 3 formed in at least two columns, and, a plurality of outlets 6 formed in at least one column which is positioned intermediate to said two columns of compartments 3.

The housing 2 and/or said door(s) 4 is/are formed substantially of any one or combination of electrically insulative material, UV stabilised material, and, a fire rated polymer such as polyethylene.

The housing 2 may include a mains power cable 13 adapted to supply mains power to said charging station 1. The housing 2 may include strategically positioned cleats 14 thereon, about which the power cord 13 may be wrapped so that it can be safely maintained in an appropriate position.

Additionally, or alternatively, the housing 2 may have a retraction mechanism associated therewith which is adapted to retract said mains power cable 13 within said housing 2. This can neatly contain any unrequired length of cable 13 whilst the charging station 1 is in use, and, also completely retract the cable 13 within the housing 2 when the charging station 1 is not in use or whilst it is being moved or relocated.

Figure 1:
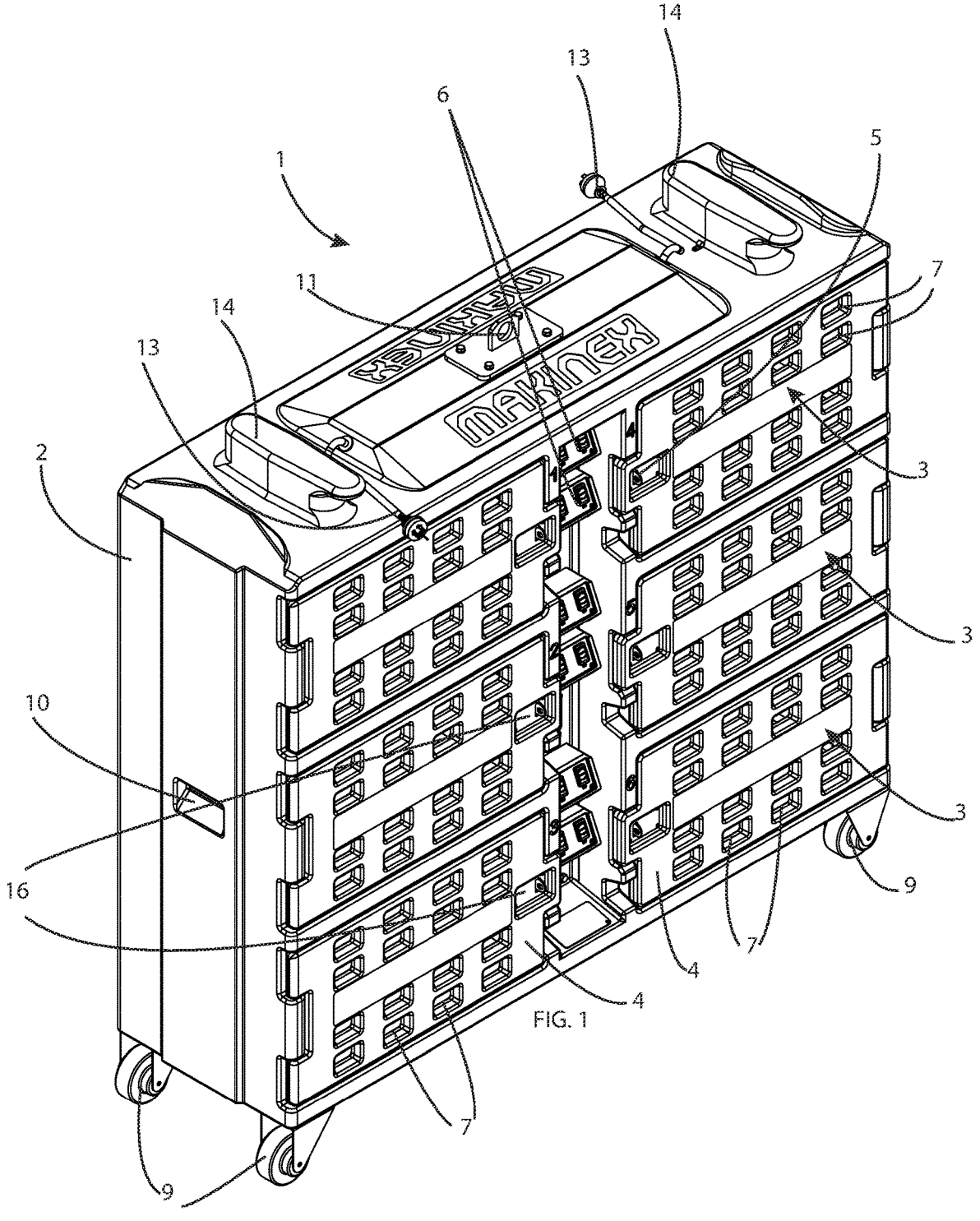
FIG. 1 illustrates a first isometric view of a power tool battery charging station in accordance with the present invention.
Figure 2:
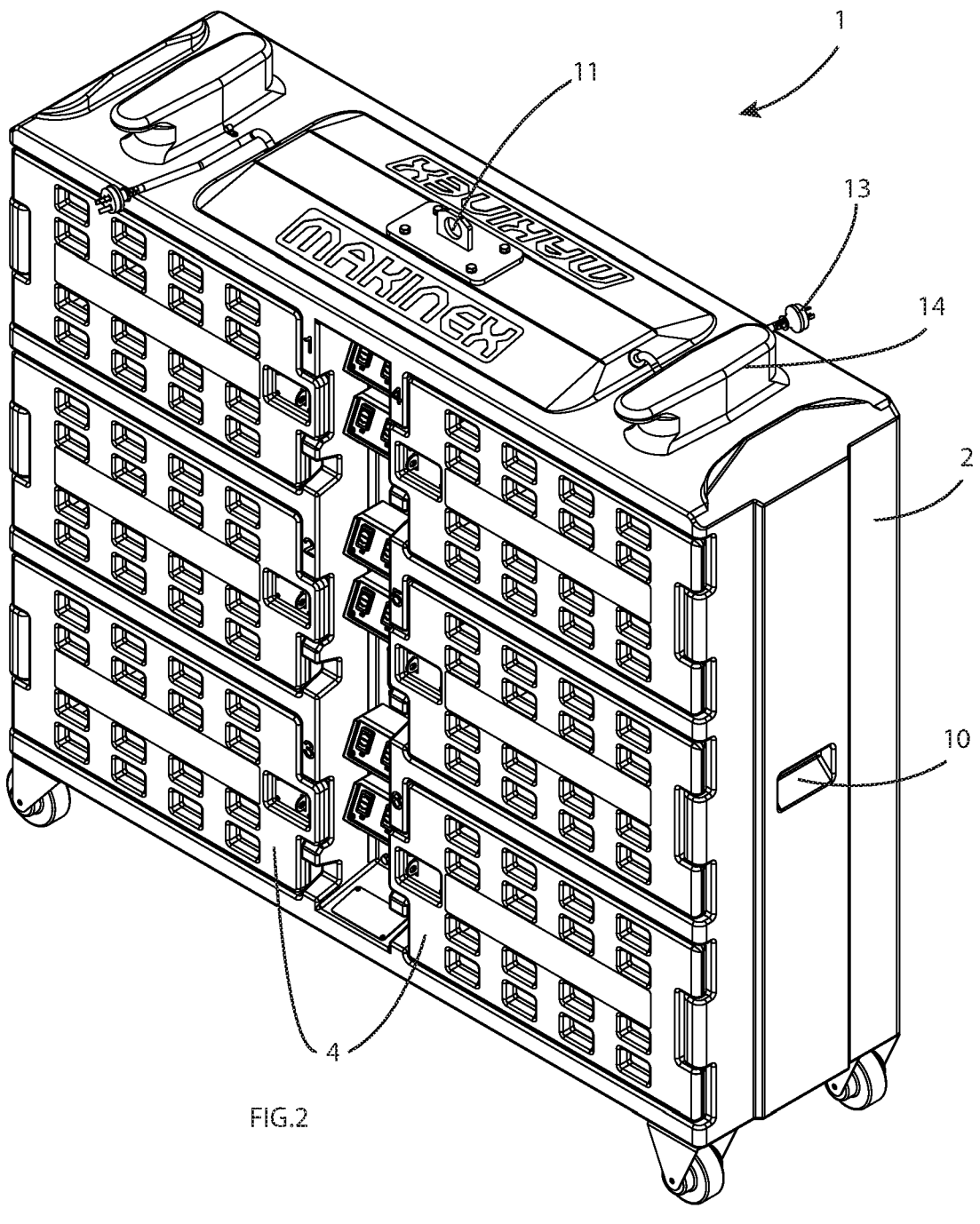
FIG. 2 illustrates a second isometric view of the power tool battery charging station.
Figure 3:
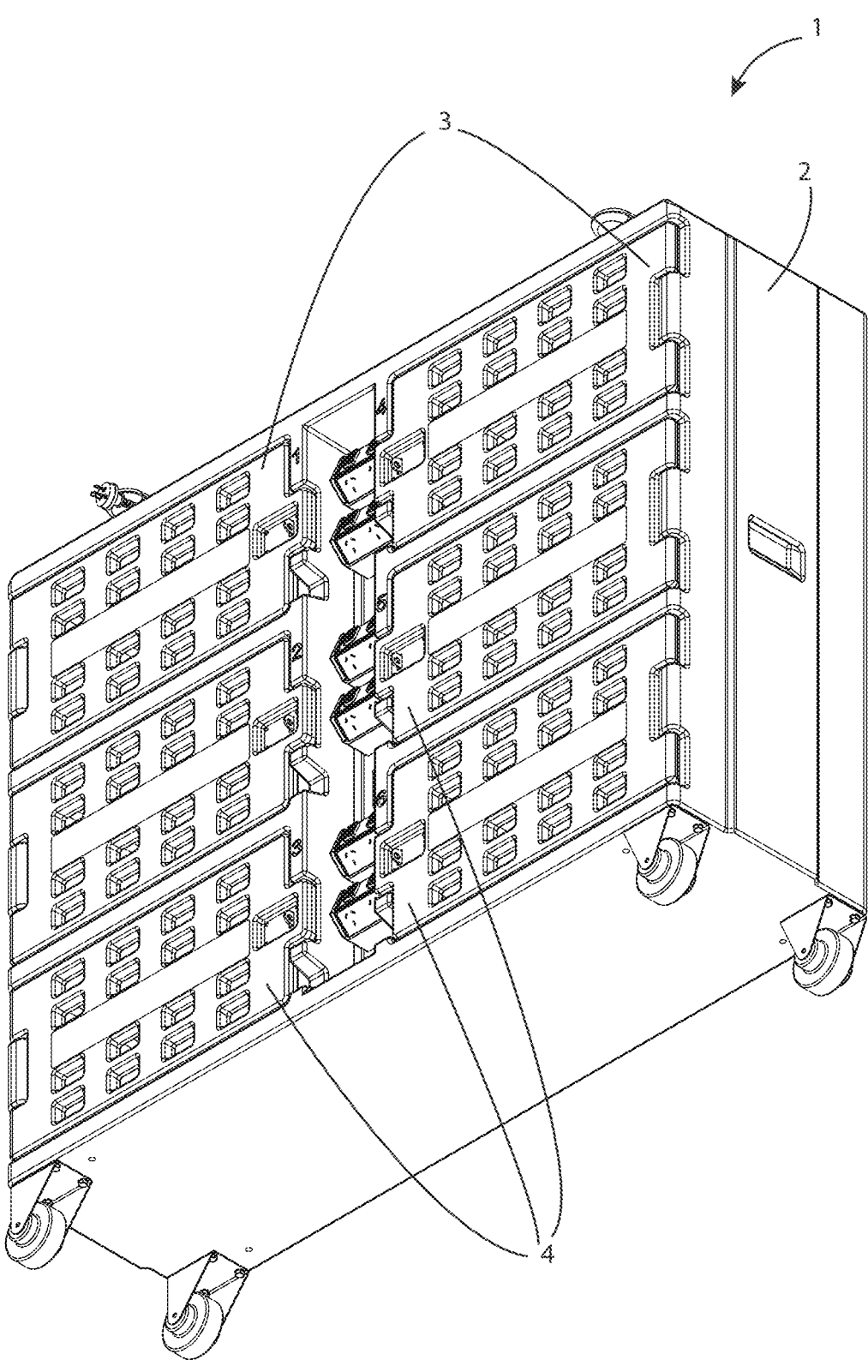
FIG. 3 illustrates a third isometric view of the power tool battery charging station.
Figure 4:
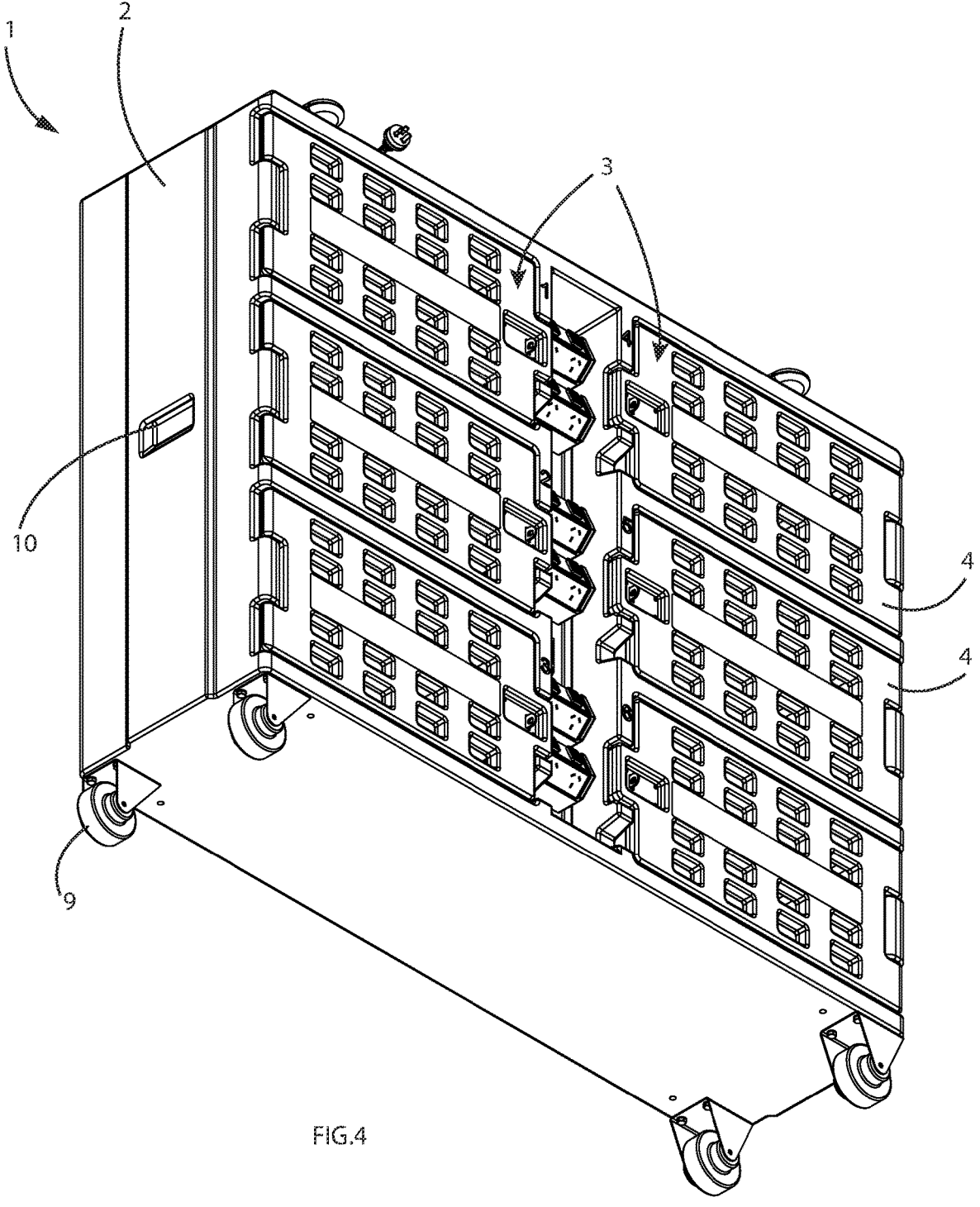
FIG. 4 illustrates a fourth isometric view of the power tool battery charging station.
Figure 5:
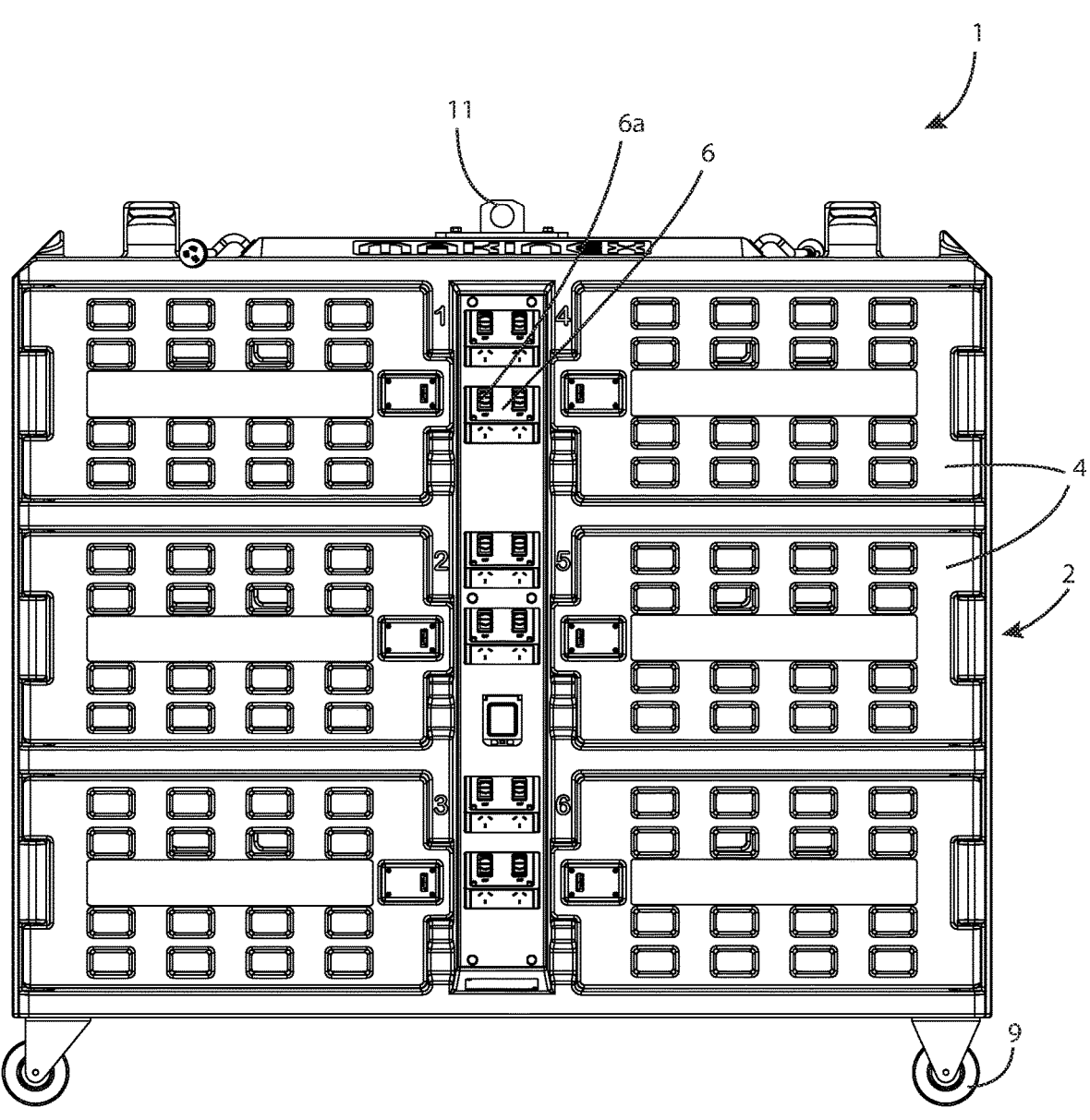
FIG. 5 illustrates a front view of the charging station.
Figure 6:
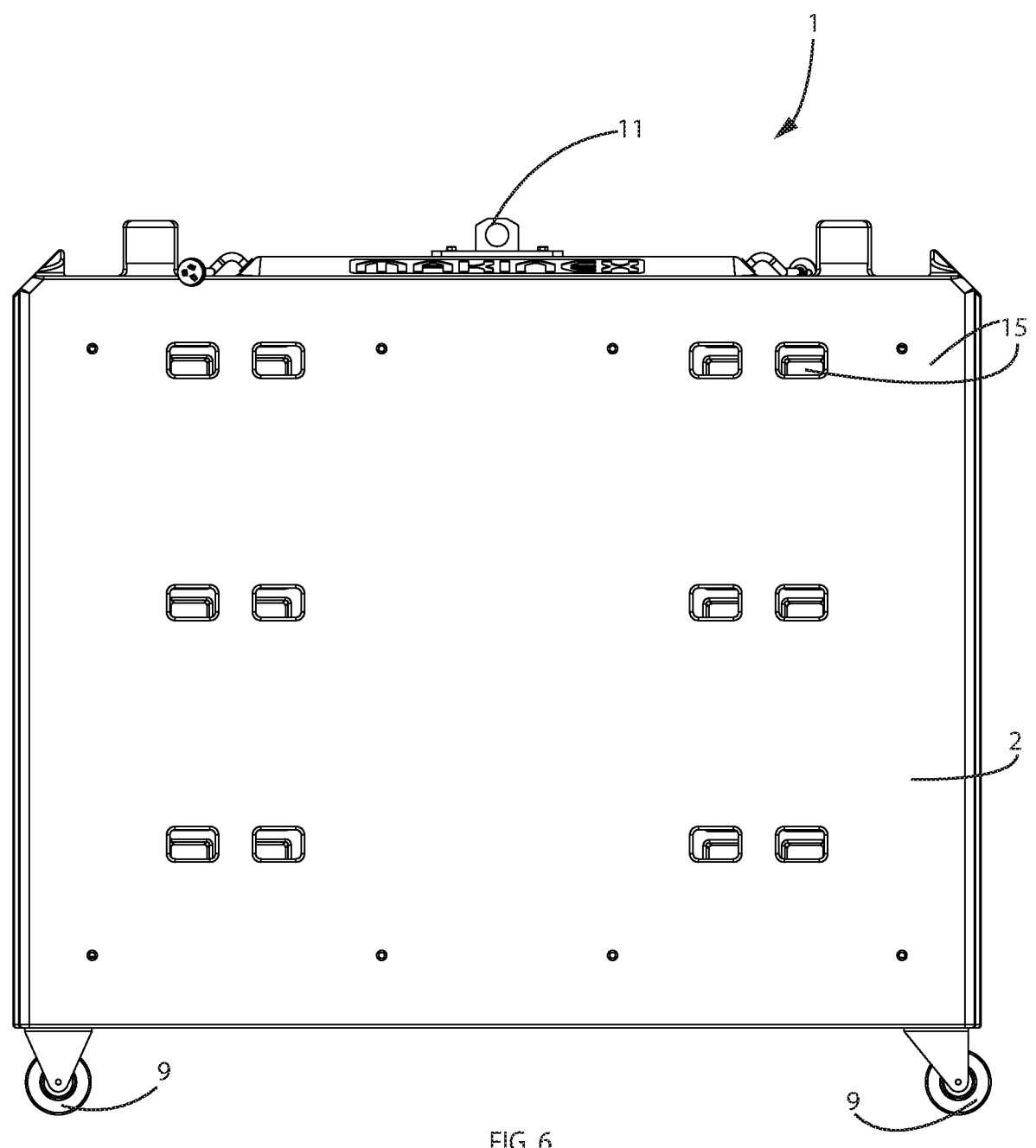
FIG. 6 illustrates a rear view of the charging station.
Figure 7:
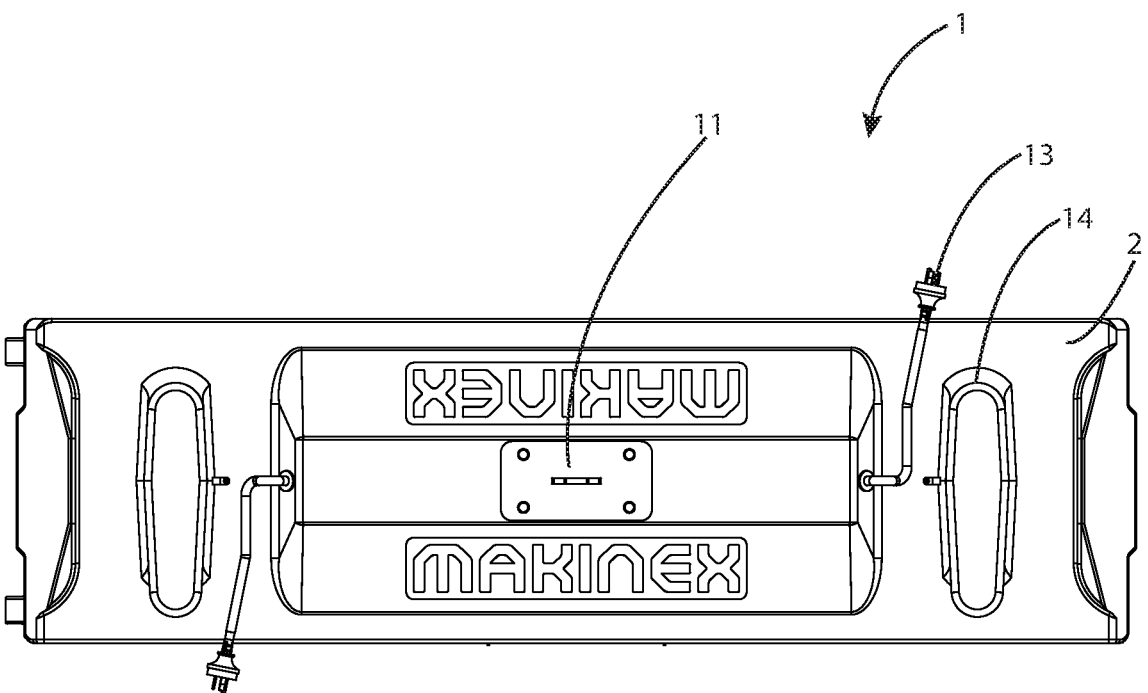
FIG. 7 illustrates a top view of the charging station.
Figure 8:
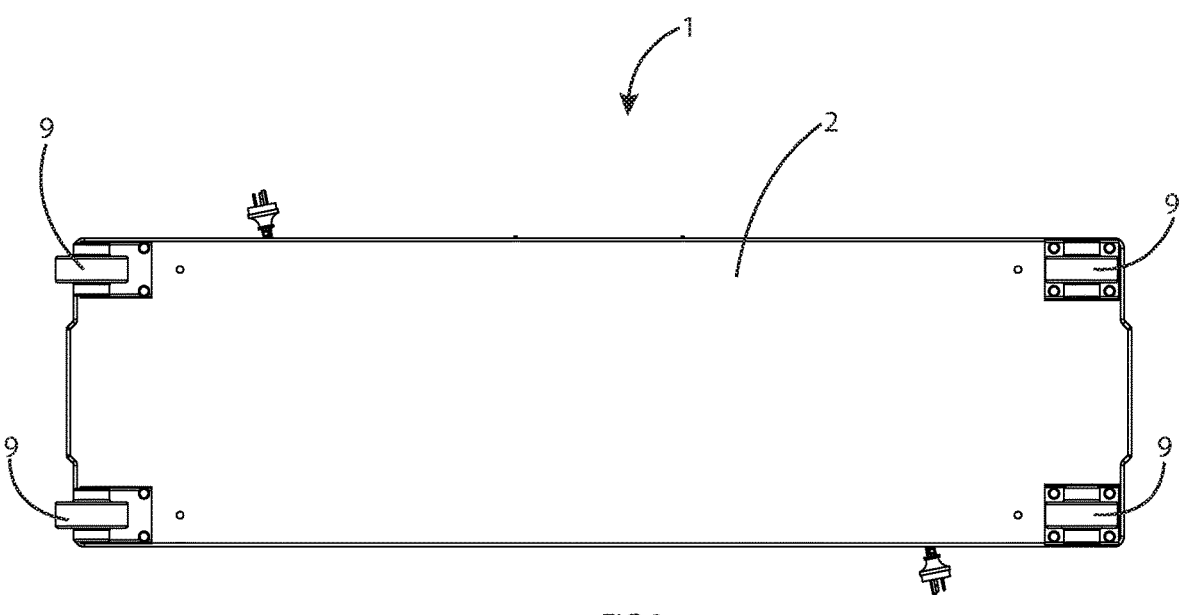
FIG. 8 illustrates a bottom view of the charging station.
Figure 9:
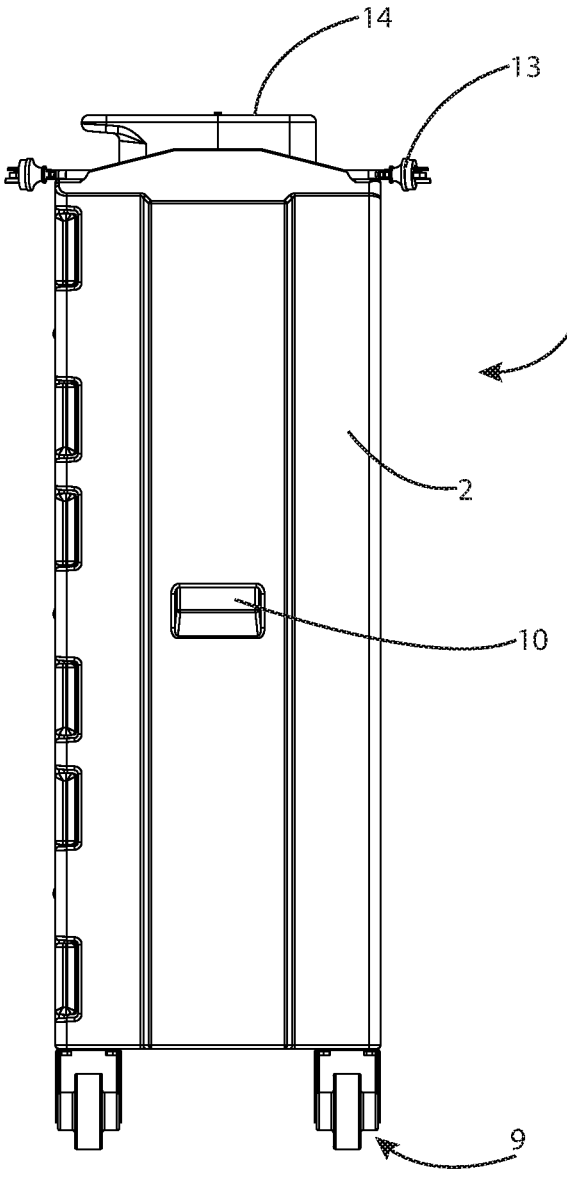
FIG. 9 illustrates a left side view of the charging station.
Figure 10:
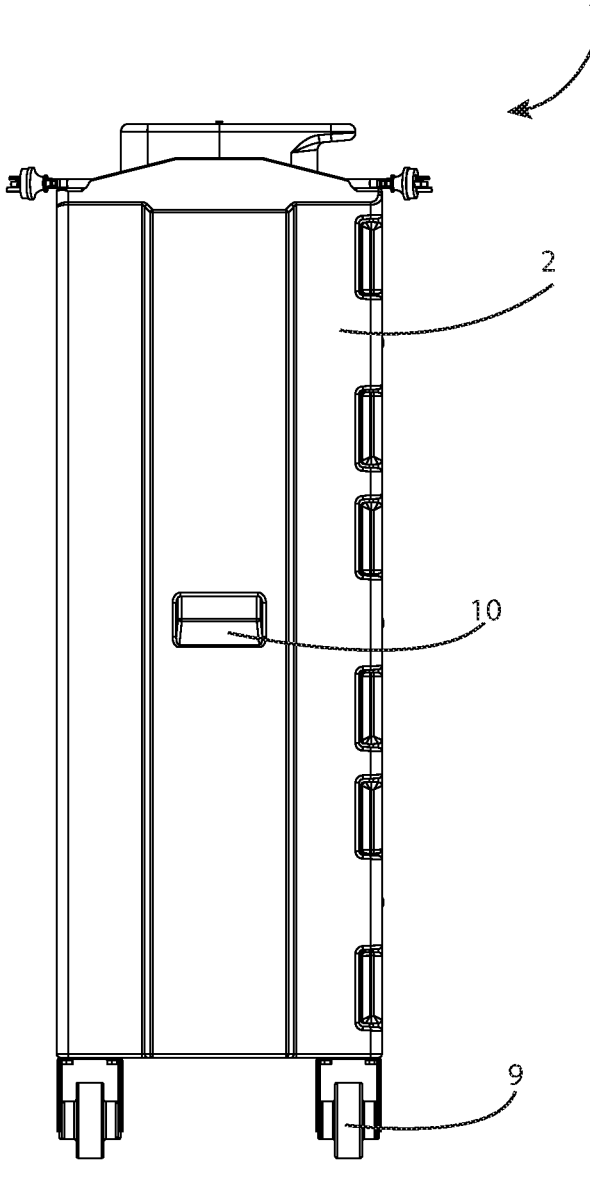
FIG. 10 illustrates a right side view of the charging station.

In another exemplary form, the housing tis adapted to be wall mounted via orifices 15 (see FIG. 6. This can be useful in certain situations, for example, when floor space is limited, when the housing is installed in a permanent or semi-permanent installation, or, when it is desired to securely retain the housing 2 to avoid movement of the charging station 1 in the event of a windy environment or the like.

It will be appreciated that the present invention therefore provides a housing in which a tradesperson's power tools may be placed whilst being charged which retains all tools in an orderly manner, which is secure to minimise the occurrence of theft which protects the tools and batteries placed there from adverse weather conditions or other environmental effects, and, which also prevents the unnecessary/unauthorised handling of a particular tradesperson's tools by another tradesperson to consequently minimising any spread of disease or the like between personnel.

Whilst the present invention has been hereinbefore described with reference to specific embodiments, it will be appreciated that numerous variations and modifications may be made thereto. All such variations and modification which become apparent to persons skilled in the art should be considered to fall within the spirit and scope of the present invention as hereinbefore described and as hereinafter claimed.

The invention claimed is:

1. A power tool battery charging station, including:
a mobile pod having a housing,
a plurality of compartments in the housing, each compartment adapted to receive at least one power tool battery charger therein;
a lockable door on each compartment, the door movable between an open position and a closed position;
a plurality of electrical outlets provided on said housing outside the compartments, each outlet adapted to receive a plug of an electrical cord of a respective power tool battery charger disposed inside the compartment; and
a cutout associated with each compartment or lockable door, the cutout being adapted to receive the electrical cord being fed from the compartment to one of the electrical outlets located outside the compartment, while the lockable door is closed,
wherein closing the lockable door causes the compartment to be closed, thereby enclosing the power tool battery charger within the compartment and retaining the electrical cord in the cutout, such that the power tool battery charger remains securely maintained within the compartment.

2. A power tool battery charging station according to claim 1, further including a circuit breaker associated with the housing, the circuit breaker operatively connected to the electrical outlets.

3. A power tool battery charging station according to claim 1, wherein each lockable door is adapted to receive one or more of:
a padlock;
a key operated lock;
an electronic lock;
a smart phone operable lock;
a fingerprint or other biometrically operated lock;
a keypad operated; or
a combination lock.

4. A power tool battery charging station according to claim 1, wherein each compartment is provided with any one or combination of:
at least one electrical cord cutout;
at least one ventilation cutout therein; and,
at least one inspection window therethrough.

5. A power tool battery charging station according to claim 1, wherein each electrical outlet is any one or combination of:

a mains power supply electrical outlet;

a single or double GPO electrical outlet; and, a weatherproof or waterproof electrical outlet.

6. A power tool battery charging station according to claim 2, wherein the circuit breaker includes an outlet/switch provided on an outer wall of said housing.

7. A power tool battery charging station according to claim 1, wherein said housing includes at least one wheel or roller thereon, optionally incorporating a locking and/or braking mechanism.

8. A power tool battery charging station according to claim 1, when said housing is mounted on a skid.

9. A power tool battery charging station according to claim 1, wherein said housing includes a motor therein for power assisted movement of said housing.

10. A power tool battery charging station according to claim 1, wherein said housing includes at least one handle.

11. A power tool battery charging station according to claim 1, wherein said housing includes at least one lifting eye thereon.

12. A power tool battery charging station according to claim 1, wherein said housing includes at least one fork lift engagement mechanism thereon.

13. A power tool battery charging station according to claim 1, wherein said housing includes at least one lock down chain point connection thereon.

14. A power tool battery charging station according to claim 1, wherein said housing includes a plurality of compartments formed in at least one of:

at least one column, wherein the compartments are substantially vertically disposed relative to each other; or at least one row, wherein the compartments are substantially horizontally disposed relative to each other.

15. A power tool battery charging station according to claim 1, wherein said housing includes:

a plurality of compartments formed in at least two columns; and, a plurality of outlets formed in at least one column which is positioned intermediate to said two columns of compartments.

16. A power tool battery charging station according to claim 1, wherein said housing and/or said door(s) comprises/comprise one or more of:

electrically insulative material,

UV stabilized material; or fire rated polymer.

17. A power tool battery charging station according to claim 1, wherein said housing includes a mains power cable adapted to supply mains power to the charging station, including one or more of:

power cleats about which a power cord may be wrapped; or a retraction mechanism adapted to retract said mains power cable within said housing.

18. A power tool battery charging station according to claim 1, wherein said housing is adapted to be wall mounted.

19. A power tool battery charging station according to claim 1, wherein the cutout comprises a recessed or partially enclosed cord-passage structure configured to retain the electrical cord when the door is closed.

* * * * *